Patented May 14, 1946

2,400,098

UNITED STATES PATENT OFFICE 2,400,098

RECOVERY OF NICKEL AND/OR COBALT FROM ORES

Vas Hubert Brogdon, Forest Hills, Long Island, N. Y., assignor to Nicaro Nickel Company, New York, N. Y., a corporation of Delaware No Drawing. Application September 29, 1942, Serial No. 460,127

5 Claims. (Cl. 75—82)

This invention relates to the recovery of nickel, and also cobalt if the same be present, from oxygenated mineral ores containing the same. More particularly, it relates to a method of treating nickeliferous lateritic serpentine type mineral either alone or in combination with nickeliferous limonite ore whereby a high yield of nickel may subsequently be obtained therefrom by ammoniacal leaching, the process being especially adapted to those lateritic ores containing up to about 2 per cent nickel which cannot be economically treated by the conventional smelting process ordinarily applied to high grade nickel ores.

The process involves a thermal reduction step wherein the nickel ore is heated under certain specific conditions which converts substantially all of the nickel to a form capable of being extracted by leaching with ammoniacal solutions.

It has already been proposed in the literature that nickel be extracted from garnierite ore, in which the nickel occurs as a hydrated silicate containing nickel and usually also iron oxides, by heating the same as high temperatures in the presence of a reducing gas, and that the products obtained may be treated with solutions of ammonium compounds to recover nickel. Whereas these processes apparently would lead to the recovery of a substantial proportion of the nickel in the high grade ore containing around 6 per cent nickel, they would not be satisfactory for the treatment of low grade ores, for the processes could not be operated to remove more than about 75 per cent of the nickel content, thereby leaving one and one-half per cent or more nickel in the residue from such treatment.

It has now been discovered that the low percentage yield in such prior processes is in part due to inefficiency in the reduction step wherein the customary heating procedure, though involving a more or less gradual increase in temperature, has had the effect of rendering a portion of the nickel content immune to reduction to the metallic state apparently by causing polymerization of the nickel oxide into an inactive form before the same can be reduced.

An object of the present invention is to provide a process whereby the quantity of nickel recovered from ores may be increased, and whereby the nickel recovered from low grade ores may amount to as much as 80 per cent or 90 per cent, leaving as little as 0.2 per cent nickel in the residue.

In a principal embodiment, the present invention may be considered to involve the combination of steps comprising heating the hydrous silicate type mineral ore containing nickel and iron compounds up to a final temperature of about 1400° F. or somewhat higher to decompose the same and form oxides of such metals, and during the decomposition reducing the nickel oxide produced at a rate more rapid than the rate at which polymerization can render the nickel oxide inactive to reduction to the metallic state. Loss of active nickel oxide by repolymerization or other action is apparently eliminated by the timely action of the reducing agent.

The controlled simultaneous decomposition and reduction of the hydrous silicate ore, in this embodiment, is carried out by increasing the temperature especially between 1200° and 1400° F. at a rate not greater than about 6° F. per minute or preferably from 2° to 6° per minute. In large scale operations or where high iron content ores or ore mixtures are treated, a somewhat higher rate of increase is permissible and may be preferable from the standpoint of economy of operation, the higher satisfactory rate being at about 8° to 10° per minute, but not more. The rate of increase of the stated maximums is ordinarily permissible only when the heating is effected by means of, or in the presence of, gases containing a very high percentage of reducing agents such as are contained in undiluted producer gas. However, if the heating is effected by gases containing a substantial proportion of combustion gases, as carbon dioxide and water vapor, the rate of temperature increase must be less than the 6° per minute for best results. For example, if combustion gases in admixture with producer gases are employed to give a ratio of $CO:CO_2$ and $H_2:H_2O$ of 60:40, the increase in temperature is preferably about 4° per minute.

The period of time during which the reduction gases are introduced depends upon their composition and also their quantity. Ordinarily a period of from one to three and one-half hours will accomplish the desired reduction. Longer reduction periods and as well an ultimate temperature higher than 1400° F. may be employed, but such do not lead to economic advantage, except with ores requiring higher temperatures for complete decomposition of the silicates.

In carrying out the reduction step of the present invention, in a multiple hearth furnace for example, undiluted producer gas may be introduced at one point of the furnace, and combustion gases may be introduced at a different point, preferably at a higher level in the furnace than that at which the producer gas is introduced. Alternatively, the producer gas may be premixed with the combustion gases and the mixture introduced into the furnace, the first method however being preferred because of its superior operating results.

In its broader aspects, the invention involves controlled slow heating of the ore in raising its temperature to any final temperature between 1100 and 1400° F. and higher, for increased yields of nickel are obtained by such procedure when heating to any final temperature within this range.

A specific example of the process of the present invention is set out below and as well a general known process by which the reduced nickel may be produced in marketable form.

A hydrated silicate and oxide lateritic ore containing nickel, some iron, and usually cobalt, such as is found in Cuba in substantial amounts, is dried to reduce substantially the moisture content, is ground to produce a finely divided mass capable of passing through a 100 mesh screen, next is preheated to a temperature below that at which decomposition occurs, or to about 1000° F. at a gradual rate which avoids agglomeration, and then is subjected to heating gases containing reducing gases in a volume which causes the temperature to increase at a slow rate, the rate between 1000 and 1400° F. being restricted to about 6° or less per minute depending upon the composition of the reducing gas. Good results are obtained when the heating is accomplished by a mixture of producer gas and combustion gas leading to a mixture of carbon monoxide and carbon dioxide in the volumetric proportion of from 30–70 per cent of one, to 70–30 per cent of the other and a mixture of hydrogen to water vapor in the volumetric proportion of 30–70 per cent of one, to 70–30 per cent of the other. Under these conditions, the amount of iron oxide reduced to ferrous oxide and/or to metallic iron is kept low without lowering the amount of nickel and cobalt reduced. When this gas mixture is employed the reduction step is usually completed in from one to two hours. By this operation, up to 90 per cent of the nickel content contained in serpentine ore is obtained in reduced form, and up to 95 per cent of the nickel content contained in limonite ore is obtained in such form.

Instead of employing producer gas as the source of reduction gases, other gases may be employed such as generator gas, water gas, cracked natural gas, or any incompletely burned gas having therein sufficient carbon monoxide or hydrogen.

Instead of employing these gases, the partially cooled or the uncooled material may be partially reoxidized by quenching by introducing the same into an ammoniacal solution to be employed later for the extraction of the nickel and cobalt. This process is disclosed in the copending application, Serial No. 461,994, filed by Clarence O. Lee, Homer A. Smith, Maurice F. Dufour and Robert C. Hills, on October 14, 1942.

Upon completion of the reduction the treated ore may then be cooled in conventional manner. For extracting the nickel and cobalt content from the cooled mass, ammonium compounds in general may be employed but it is preferred to use an ammonium carbonate solution containing an equal quantity by weight of ammonia combined as ammonium hydroxide. A satisfactory solution is one containing 3 per cent by weight of ammonia in each of the said ammonium compounds. The operation is carried out with aeration preferably in a three or four stage countercurrent leaching bath treatment, whereby a solution of nickel of one per cent strength is built up. The aeration is effected by the introduction of oxygen or air, the oxygen being employed satisfactorily in the molar ratio of 3:1 as related to the nickel and cobalt content. The ore is washed to remove the last traces of ammonium compounds in order that the same may be recovered together with the ammonia content in the leaching solution and the nickel and cobalt content of the product leach liquor is next separated therefrom by distilling off ammonia, which causes their precipitation.

The separated nickel and cobalt compounds may then be converted into their respective oxides by drying and calcining. Thereafter, the relatively pure nickel oxide may be reduced to nickel in a form suitable for marketing. The cobalt oxide may be further refined to suit market requirements.

It should be understood that the present invention is not limited to the exact conditions and procedures described above, but that it extends to all equivalents which will occur to those skilled in the art upon consideration of the claims appended hereto.

I claim:

1. The process of recovering nickel from nickeliferous lateritic ore containing serpentinic mineral and iron compounds, which comprises heating the ore and reducing the nickel minerals therein by introducing into contact with the ore a hot reducing gas mixture containing $CO:CO_2$ and $H_2:H_2O$ within the volumetric range ratio of 30–70:70–30, and increasing the temperature between 1000° F. and a temperature above 1100° F. at which decomposition of the nickel minerals is substantially complete at a rate between 2 and 10° F. per minute dependent upon the proportion of reducing constituents in the gas introduced into contact with the ore, the lower the said proportion the lower the maximum permissible rate of temperature increase within said range.

2. The process of recovering nickel from nickeliferous lateritic silicate ores containing iron compounds, which comprises heating the ore and reducing the nickel minerals therein by introducing into contact with the ore a hot reducing gas mixture containing $CO:CO_2$ and $H_2:H_2O$ within the volumetric range ratio of 30–70:70–30, and while the temperature is increasing from 1000° F. to a temperature between 1100° F. and 1400° F. at which decomposition of the nickel mineral content is substantially complete, limiting the temperature increase to a rate within the range of 2 to 10° F. per minute which is dependent upon the proportion of reducing constituents in the gas introduced into contact with the ore, the lower the said ratio the lower the maximum permissible rate of temperature increase must be.

3. The process of recovering nickel from nickeliferous lateritic ore containing serpentinic mineral and iron compounds, which comprises heating the ore and reducing the nickel minerals therein by introducing into contact with the ore a hot reducing gas mixture containing $CO:CO_2$ and $H_2:H_2O$ within the volumetric range ratio of 30–70:70–30, and while the temperature is increasing from 1000° F. to a temperature above 1100° F. at which decomposition of the nickel mineral content is substantially complete, restricting the temperature increase substantially to the maximum rate within the range of 2 to 10° F. per minute at which inactivation of the nickel compounds in the ore toward reduction is not effected, said highest rate being dependent upon the proportion of reducing gases in the reducing gas mixture introduced into the ore, the lower the said proportion, the lower the maximum permissible rate of temperature increase must be.

4. The process of increasing the yield of nickel obtainable by ammoniacal leaching from lateritic ores containing serpentinic mineral and containing up to about 2 per cent nickel which comprises heating the ore and reducing the nickel minerals therein by introducing into contact with the ore a hot reducing gas mixture containing $CO:CO_2$ and $H_2:H_2O$ in a ratio within the volumetric range of ratios of 30–70:70–30 which reduces at least about 80 per cent of the nickel content and only small amounts of the iron to a state soluble in the ammoniacal leaching liquors, increasing the temperature during said heating at a rate of from 2 to 10° F. per minute between 1000° F. and a final temperature of from 1100° F. to 1400° F., the rate within said range employed being dependent upon the proportion of reducing gases in the reducing gas mixture introduced into the ore, the lower the said proportion the lower the maximum permissible rate of temperature increase must be.

5. The process of conditioning nickeliferous hydrous silicate ore containing iron and cobalt in addition to the nickel for more efficient extraction of the nickel and cobalt content by leaching with an ammoniacal solution, the process comprising heating the ore in finely divided form to a temperature above 1100° F. at which decomposition of the nickel mineral has occurred by introducing into montact with the ore a hot reducing gas mixture containing $CO:CO_2$ and $H_2:H_2O$ within the volumetric range ratio of 30–70:70–30 and while the temperature is increasing from 1000° F. to the temperature at which decomposition of the nickel mineral content is substantially complete, restricting the temperature increase to a rate within the range of 2 to 10° F. per minute, the exact rate employed being dependent upon the proportion of reducing gases in the reducing gas mixture introduced into the ore, the lower the said proportion the lower the maximum permissible rate of temperature increase must be.

VAS HUBERT BROGDON.

Certificate of Correction

Patent No. 2,400,098. May 14, 1946.

VAS HUBERT BROGDON

It is hereby certified that errors appear in the printed specification of the above numbered patent requiring correction as follows: Page 1, first column, line 23, for "as high" read *at high*; page 2, first column, line 54, beginning with the words "Instead of" strike out all to and including "October 14, 1942." line 62, same page and column; page 3, second column, line 9, for "montact" read *contact*; and that the said Letters Patent should be read with these corrections therein that the same may conform to the record of the case in the Patent Office.

Signed and sealed this 23rd day of July, A. D. 1946.

[SEAL]

LESLIE FRAZER,
*First Assistant Commissioner of Patents.* the proportion of reducing gases in the reducing gas mixture introduced into the ore, the lower the said proportion, the lower the maximum permissible rate of temperature increase must be.

4. The process of increasing the yield of nickel obtainable by ammoniacal leaching from lateritic ores containing serpentinic mineral and containing up to about 2 per cent nickel which comprises heating the ore and reducing the nickel minerals therein by introducing into contact with the ore a hot reducing gas mixture containing $CO:CO_2$ and $H_2:H_2O$ in a ratio within the volumetric range of ratios of 30–70:70–30 which reduces at least about 80 per cent of the nickel content and only small amounts of the iron to a state soluble in the ammoniacal leaching liquors, increasing the temperature during said heating at a rate of from 2 to 10° F. per minute between 1000° F. and a final temperature of from 1100° F. to 1400° F., the rate within said range employed being dependent upon the proportion of reducing gases in the reducing gas mixture introduced into the ore, the lower the said proportion the lower the maximum permissible rate of temperature increase must be.

5. The process of conditioning nickeliferous hydrous silicate ore containing iron and cobalt in addition to the nickel for more efficient extraction of the nickel and cobalt content by leaching with an ammoniacal solution, the process comprising heating the ore in finely divided form to a temperature above 1100° F. at which decomposition of the nickel mineral has occurred by introducing into montact with the ore a hot reducing gas mixture containing $CO:CO_2$ and $H_2:H_2O$ within the volumetric range ratio of 30–70:70–30 and while the temperature is increasing from 1000° F. to the temperature at which decomposition of the nickel mineral content is substantially complete, restricting the temperature increase to a rate within the range of 2 to 10° F. per minute, the exact rate employed being dependent upon the proportion of reducing gases in the reducing gas mixture introduced into the ore, the lower the said proportion the lower the maximum permissible rate of temperature increase must be.

VAS HUBERT BROGDON.

Certificate of Correction

Patent No. 2,400,098.    May 14, 1946.

VAS HUBERT BROGDON

It is hereby certified that errors appear in the printed specification of the above numbered patent requiring correction as follows: Page 1, first column, line 23, for "as high" read *at high*; page 2, first column, line 54, beginning with the words "Instead of" strike out all to and including "October 14, 1942." line 62, same page and column; page 3, second column, line 9, for "montact" read *contact*; and that the said Letters Patent should be read with these corrections therein that the same may conform to the record of the case in the Patent Office.

Signed and sealed this 23rd day of July, A. D. 1946.

[SEAL]

LESLIE FRAZER,
*First Assistant Commissioner of Patents.*